United States Patent [19]

Ziccarelli et al.

[11] 4,151,308
[45] Apr. 24, 1979

[54] METHOD FOR PRODUCING A FAST MIXED AND MILLED CONCHABLE CANDY AND PRODUCT THEREOF

[75] Inventors: Salvatore F. Ziccarelli, Downers Grove; Peter P. Noznick, Evanston, both of Ill.

[73] Assignee: Beatrice Foods Co., Chicago, Ill.

[21] Appl. No.: 905,530

[22] Filed: May 12, 1978

[51] Int. Cl.² .......................... A23G 1/00; A23G 1/16
[52] U.S. Cl. .................................. 426/613; 426/631; 426/659; 426/660
[58] Field of Search ............... 426/613, 631, 660, 519, 426/659, 99, 103

[56] References Cited

U.S. PATENT DOCUMENTS

| | | | |
|---|---|---|---|
| 1,387,377 | 8/1921 | Fryer et al. | 426/519 |
| 2,356,181 | 8/1944 | Rubens | 426/613 |
| 2,459,908 | 1/1949 | Alikonis | 426/660 |
| 2,673,802 | 3/1954 | Hansen | 426/519 |
| 3,579,355 | 5/1971 | Wyss et al. | 426/576 |
| 3,976,806 | 8/1976 | Ziccarelli | 426/613 |
| 4,017,645 | 4/1977 | Ziccarelli | 426/613 |
| 4,042,721 | 8/1977 | Ziccarelli | 426/613 |

Primary Examiner—Jeanette M. Hunter
Attorney, Agent, or Firm—Murray and Whisenhunt

[57] ABSTRACT

There is provided a method for producing a chocolate candy, wherein the conventional candy ingredients of sugar, fat and cocoa are mixed in a high speed shearing and mixing device, as opposed to the conventional mixing and milling devices, the resulting mixed paste is conched to the finished candy, e.g., candy coating, by conching in a high speed shearing and mixing device. The shear component in both the mixing and conching step must be 75° or greater. The temperature of the mixing step should not exceed about 120° C. and the mixing time should be less than 5 minutes whereby the average particle size in the resulting paste mixture is 120 microns or less. In the conching step temperatures of between about 60° C. and 160° C. in conching times of 30 seconds or less are reached, whereby the average particle size of the conched mixture is reduced to 40 microns or less and the moisture content of the conched mixture is reduced to 8% or less.

15 Claims, 1 Drawing Figure

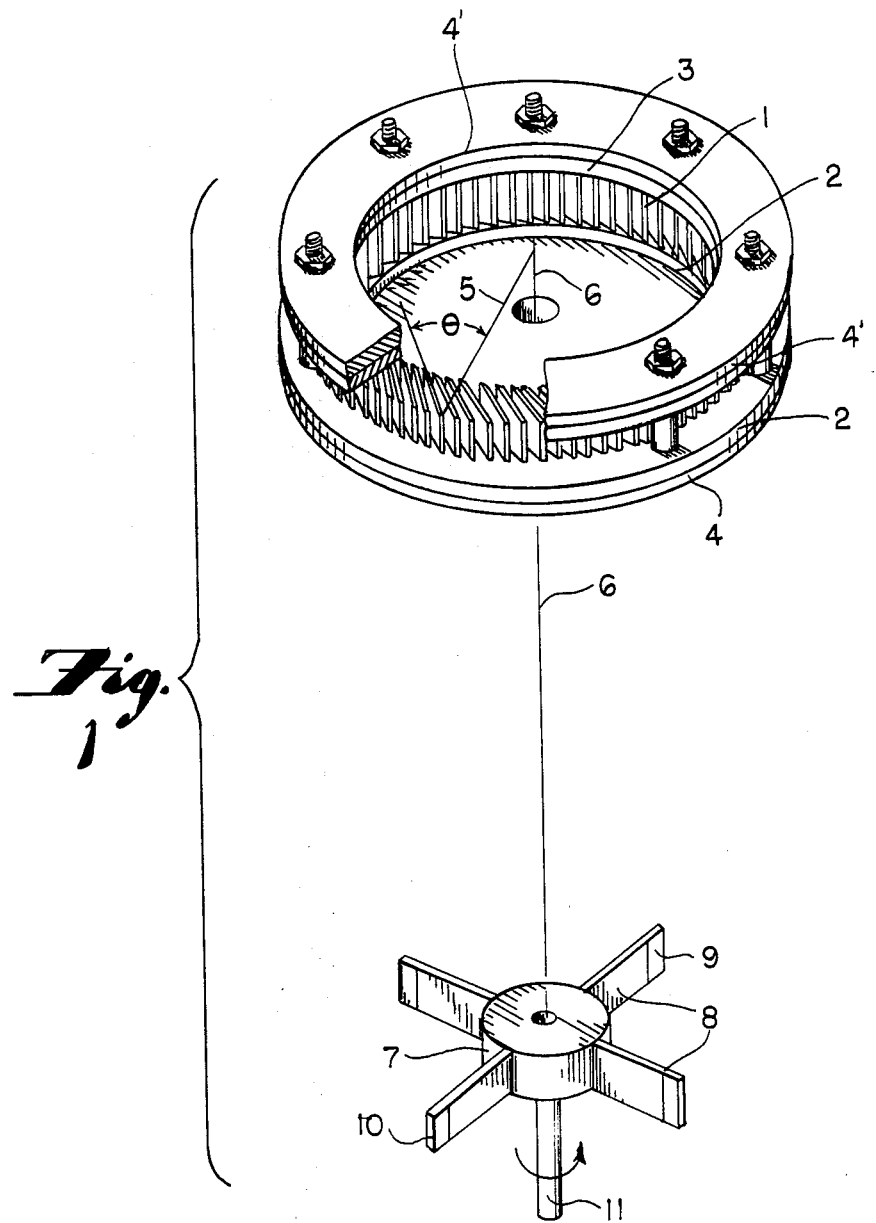

METHOD FOR PRODUCING A FAST MIXED AND MILLED CONCHABLE CANDY AND PRODUCT THEREOF

The present invention relates to a method of producing a candy, and especially a candy coating where the candy is produced by, essentially, mechanical mixing and milling of the ingredients. More particularly, the invention relates to an improvement in the processes described and claimed in U.S. Pat. No. 3,976,806 issued Aug. 24, 1976; U.S. Pat. No. 4,017,645 issued Aug. 12, 1977; and U.S. Pat. No. 4,042,721 issued Aug. 16, 1977.

BACKGROUND OF THE INVENTION

Candies are conventionally prepared by cooking combinations of sugar, fats and flavors until the sugar has inverted and the cooled mixture congeals into a solid mass. In these kinds of candies, all of the ingredients must be solubilized during the cooking process or the ingredients must be pulverized prior to the cooking process to an average particle size which will not produce a "gritty" mouth feel in the cooked candy. The cooking process, however, is most time consuming and expensive.

So to avoid those difficulties, a second type of candy is conventionally prepared without the conventional cooking method. In this process, the ingredients are mechanically milled until the average particle size of the ingredients is reduced to below that average size which produces the "gritty" mouth feel. While this process does avoid the problems associated with the cooking process and the process can be carried out essentially automatically on conventional machinery, the process requires long milling times and expensive machinery. Further, the time required to mill conventional ingredients to the extent that the average particle size of the mixed ingredients is reduced to below that particle size where essentially all of the "gritty" mouth feel is eliminated, is quite long.

Thus, as a typical example of that conventional process, the dry ingredients are first reduced in particle size to that extent practical, e.g., sugar, cocoa, milk solids, and the like, are pulverized, e.g., milled or ground to a reduced particle size. The pulverized dry ingredients are then mixed with the fat, flavors and other non-dry ingredients in a mixing/milling device. While these known devices can take various forms, they are generally the compression/rolling/shearing type. Thus, while the devices mix the ingredients, reduce the particle size by grinding and by some shearing of the particles, especially by particle to particle contact, for simplicity herein they will be referred to as mixing or milling devices and the step as a mixing or milling step, since these are major functions thereof. These devices are typically conventional calendering or roller mills.

The mixing operation can typically take from 5 to 24 hours, with the longer mixing times being preferred.

The paste is then passed to a conventional "concher" which again uses similar mechanical action to slowly grind the ingredients into the fat. The conching operation also, and most importantly, serves to develop flavor in the conched ingredients. For example, in a conched chocolate coating, the gritty texture of the paste disappears and the chocolate flavors only begins to appear after about 8 hours of conching. Even with this length of time, the resulting candy would be acceptable only for the lower grade candy coating compounds. For higher grade candy coatings and for candy per se, that conching time must be substantially extended and conching times up to 85 hours are used.

In the aforementioned U.S. patents, an improved candy making process is described wherein that conching time is reduced to less than 30 seconds by conching the paste mixture with high speed shearing and mixing wherein the mixture is subjected to shearing forces having an average shear component of 75° or greater to produce an essentially mechanically generated conching temperature of at least 60° C. and the particle sizes of the solids in the composition are reduced to 40 microns or less. This conching step is carried out by an apparatus which essentially comprises an impeller or anvil rotating within a series of blades forming a circular array thereof. This apparatus generates shear forces on the paste being conched and affects the conching in a very short time. The apparatus for carrying out the conching is considerably less complicated than conventional apparatus and not only very substantially reduces the conching time, but reduces the capital investment for the conching equipment. All of this is accomplished without any decrease in the flavor of the candy developed during the conching step. As explained above, the conching step not only reduces the particle size of the ingredients but develops flavor in the composition.

While this process is a substantial advance in the art, the process still requires a first mixing step of the ingredients, along with the associated longer mixing times and complicated and expensive mixing apparatus. It would, therefore, be of substantial benefit to the art if the mixing process could be considerably shorten in time and carried out with less expensive equipment. This must, of course, be accomplished without loss of flavor in the ultimately produced candy.

OBJECTS OF THE INVENTION

It is therefore an object of the invention to provide a method and candy produced thereby, wherein the mixing step may be completed in a fraction of the time required for conventional mixing and in which the mixed ingredients may be conched in either conventional conching operations or with the fast conching process of the aforementioned patents. It is a further object of the invention to provide such improved mixing step where the resulting candy is at least equal to the quality of conventionally prepared candy in terms of both the mouth feel (texture) and flavor developed. In this regard candy, as hereinafter used in the specification and claims, includes "pastel" candy (fat/sugar/flavor), chocolate liquor, cocoa powder with added sugar (and usually fat), milk and sweet chocolate, and compound coatings, e.g., bar coatings. Other objects will be apparent from the following disclosure and claims.

BRIEF DESCRIPTION OF THE DRAWING

The drawing, FIG. 1, shows in perspective diagrammatic form an apparatus suitable for carrying out the mixing step of the present invention, as well as the preferred conching step of the invention.

BRIEF DESCRIPTION OF THE INVENTION

The present invention is based on two principal discoveries. Firstly, it has been discovered that a paste of conventional candy ingredients, e.g., sugar, fat, cocoa, flavorings, emulsifiers, milk solids, and the like, can be prepared without the necessity of the heretofore used milling operations. It was priorly thought that milling of the ingredients was required to provide a stable paste of the dry ingredients and the non-dry ingredients. The milling operation was thought to so completely develop a stable slurry that the resulting paste could be placed in the concher and the ingredients would not separate or otherwise form a non-homogeneous composition during the conching operation. As can be appreciated, if the ingredients separated from the paste during conching, the conching would not accomplish the object intended.

Secondly, it was discovered that a paste suitable for the conching operation could be achieved in a manner similar to that of the conching process of the aforementioned patents. The apparatus fo the aforementioned patents is suitable for producing that paste, although modifications of the operation of that apparatus are required.

Thus, briefly stated, the present invention provides a method for producing a candy comprising mixing and milling the ingredients of at least sugar and fat by high speed shearing and mixing wherein the ingredients are subjected to shearing forces having an average shear component of 75° or greater to produce an essentially mechanically generated mixing temperature of 120° C. or less and to produce a paste mixture having an average particle size of the ingredients therein of less than 100 microns in a mixing time of less than 5 minutes. Thereafter, this paste is conched, e.g., according to the process of the above-noted patents, where the paste mixture is subjected to high speed shearing and mixing wherein the mixture is subjected to shearing forces having an average shear component of 75° or greater to produce an essentially mechanically generated conching temperture in the mixture of about 60° C. to about 160° C. in a conching time of 30 seconds or less and to reduce the average particle size of the ingredients to 75 microns or less, and to reduce the moisture content of the mixture to 8% or less.

Preferably, the mixing is carried out in a plurality of serial steps and more preferably where the shear component degree of the first step is less than the shear component degree of the last step. Thus, a plurality of the apparatus described in the aforementioned patents will be preferably used in the present mixing process, whereby the larger particle sizes of the conventional candy ingredients are serially reduced to particles sizes acceptable for the conching operation and where a paste is ultimately produced which can be acceptably conched thereby.

DETAILED DESCRIPTION OF THE INVENTION

It is initially noted that a wide variety of candy ingredients may be used in the present process. The only necessary ingredients, of course, are the fat and sugar. The other ingredients, including the flavoring, will be chosen according to the particular candy being produced. However, the present process has very special applicability to producing a chocolate candy, since as is well known, cocoa is not solubilized by fat and the cocoa must be reduced in particle size and, most importantly, mechanically worked into the fat in order to develop the chocolate flavor. Further, chocolate candy, to be of desirable quality, must also contain milk or a milk substitute, in a dry form, e.g., milk solids or whey solids. These solids must also be reduced in particle size and most intimately mixed with the cocoa, fat and sugar in order to produce an acceptable chocolate flavor.

Thus, the invention has most particular relevancy to producing chocolate and for the sake of conciseness, the invention will be discussed and illustrated in connection therewith.

Generally, the candy composition will have 25 to 70 parts fats, 20 to 70 parts sugar and 0.1 to 20 parts cocoa. Optionally, but most preferably, the ingredients will include 0 to 30 parts milk and/or whey solids and 0 to 2 parts emulsifier. Most chocolates also include an additional flavor, such as vanilla, and the amount thereof will generally be 0 to 4 parts. Also, in order to provide a smooth and creamy texture, an emulsifier is normally used in chocolate. The emulsifier will be from 0 to 3 parts. The preferred ratio of ingredients will be 30 to 35 parts fats, 40 to 55 parts sugar, 4 to 12 parts cocoa, 3 to 8 parts milk and/or whey solids, 0.1 to 8 parts emulsifier and 0.1 to 2 parts flavors.

The fat may be any of the conventional fats, e.g., vegetable fat, butter fat, cocoa butter, and hard butter (32° C.–53° C. melt) is preferred, since it produces a superior quality chocolate.

As noted, vanilla flavor is usually contained in the chocolate, but other flavors may be used as desired, including fruit flavors, spice flavors and the like.

The milk must be in a dry form, e.g., non-fat milk or skim milk or whole milk solids, whey demineralized whey and the like.

The sugar is conventional sucrose, although combinations of sugars may be used, including dextrose (corn syrup solids), fructose, and the like. Similarly, conventional cocoa is used. In this regard, cocoa refers to the powdered cocoa nibs, either the whole nibs or the defatted cocoa nibs.

The emulsifiers can be any of the food-grade emulsifiers such as the Spans and Tweens, mono- and diglycerides and lecithin.

Finally, salt, stabilizers, anti-oxidants, food-grade bactericides, such as BHA, BHT, and the like may be used.

A suitable device for the invention is known and manufactured by the Urschel Co. As shown in the drawing, a series of blades 1 are held in position by lower holding ring 2 and an upper holding ring 3. A lower retaining ring 4 and an upper retaining ring 4' complete this blade assembly. The blades are spaced apart a small distance, i.e., between 0.005 and 0.3 inch, depending upon the particle sizes of the solids to be mixed into the paste, the feed rates, the temperature of the ingredients entering the apparatus and the offset angle from a diameter of the assembly (explained further hereinafter). Generally, the blades are spaced apart about 0.1 to 0.2 inch, e.g., 0.15 inch. The blades are set near radii 5 generating from axes 6. The blades are actually offset from that radius, or diameter, by angle $\theta$ (exaggerated in the drawing for illustration purposes). This angle will induce a shear component when the apparatus is operating, as explained more fully hereinafter.

An impeller 7 has impeller arms 8 which carry an impeller surface 9. The outer most ends of the impeller surface have a square shear surface end. The impeller rotates on shaft 11 which is in mechanical communication with the power source (not shown).

The impeller fits within the array of blades and the distance between shear surface 10 and the blades is very small, i.e., between 0.1 and 0.01 inch. As the impeller shaft rotates, the impeller which is mechanically fixed thereto, also rotates. The ingredients are fed into the rotating impeller and are impelled outwardly toward the blades. As the ingredients contact the blades, a shear force, in the direction of rotation, is created between the blades and the shear surface. Solid particles are therefore sheared between the blades and the impeller in such a manner that the particles are cut or sliced rather than ground or crushed as was the prior art technique with conventional mixers.

It will be appreciated that if the average shear component is 90° ($\theta$ equals 0), then the shear will be substantially reduced and mechanical friction will be substantially increased, generating increased heat and decreased shear. In extreme cases this can cause carmelization of the sugar and deterioration of the flavors of other of the ingredients, e.g., burning of the milk powder and the like. Therefore, the average shear component during the mixing operation is less than 90° (with the exception noted below), although that shear component can very closely approach 90° with impunity. The substantial increase in generated mechanical heat appears to take place only when the 90° shear component is very closely approached. On the other hand, if the shear component is too low, the amount of shear will not be sufficient for the fast mixing envisioned. Accordingly, the average shear component should be at least 70° in order to ensure that proper shearing takes place, but it is preferred that the average shear component be at least 85°. However, to avoid overheating, the average shear component is usually not greater than 89.5° (with the exception noted below). A preferred range is between 87° and 89°.

Since the ingredients to be mixed may have relatively large average particle sizes, it is often difficult to carry out the entire mixing operation with a single apparatus having a single configuration of blades (shear component). Thus, more conveniently, the mixing is carried out in a plurality of serial steps, i.e., the ingredients are passed through a first device, as described, and then through a second, third, or even fourth device in a serial manner. As the particle sizes of the ingredients are reduced when passing through a first device, the shear component can be increased with the next succeeding device, since it will encounter smaller particle sizes. Thus, preferably, the shear component degree of the first step is less than the shear component degree of the last step in the mixing process.

When particle sizes are reduced to that acceptable for the conching operation, a final shearing step can be performed wherein the particles are essentially rolled in the device and the temperature is momentarily increased to ensure a homogeneous and well mixed paste. To this end, the last shearing device in the series thereof can have a shear component of 90°. This will not accomplish substantial shearing, and, therefore, will not greatly reduce the overall average particle size, but it will serve to narrow the range of particle sizes, and momentarily heat the paste to a higher temperature to ensure complete homogenization.

The particular shear component degree in the series of steps is not critical and, indeed, with careful selection of ingredients and with low feed rates the entire mixing can be carried out with a single shearing device. However, when a series of shearing devices are used, the shear component can be adjusted for the number of devices, the particle sizes of the entering ingredients, the feed rate, and the like, by increasing the shear component in the series of devices until the temperatures of the ingredients during the mixing step closely approach the optimum temperatures, discussed below, or at least do not exceed the maximum temperatures. However, even with a series of shearing devices, the particle sizes of the ingredients to be mixed should not exceed about 900 microns, since this would require an impractical number of shearing devices. Further, the devices will normally be operated only with conventional sizes of entering ingredients, e.g., with average particle size thereof at least 100 microns.

For the reasons explained above, the temperature during the mixing step, whether performed in a single shearing device or in a series of shearing devices should not exceed about 120° C. Otherwise the undesirable degradation will commence. Further, since that undesirable degradation is a function of both temperature and time, the shearing device should be adjusted so that the mixing step can reduce the average particle size of the ingredients to 120 microns or less in a mixing time of less than 5 minutes. That micron particle size is small enough to be acceptably conched in the conching operation and times up to 5 minutes of mixing will not seriously degradate the flavors of the product. However, it is preferred that the mixing time be considerably shorter than 5 minutes, e.g., less than 3 minutes and more preferably less than 1 minute. A mixing time of about 30 seconds or less is preferred. Similarly, it is preferred that the average particle size of the mixed ingredients be less than 120 microns, preferably less than 100 microns, and more preferably less than 75 microns.

Consisting with achieving the reduction of the particle size explained above, and within the time and temperature limitations stated, optimum conditions have also been determined. Thus, to ensure that no substantial degradation occurs, the mixing temperature is preferably 110° C. or less, and more preferably 93° C. or less. On the other hand, mixing is not adequately performed unless there is an increase in temperature and the mixing temperature should preferably reach 50° C., and more preferably at least 65° C. This will ensure that the mixed paste is homogeneous and fully acceptable for the conching operation.

As an alternative to the process described above, each of the separate non-dry ingredients, or portions of those ingredients, may be separately passed through a shearing device to reduce the particle size thereof. Those reduced particle sizes may then be combined, blended and passed through a shearing device or devices to produce the required paste. This is not, however, a preferred form of the invention, since ultimately the fat and other non-dry ingredients must be completely blended into a paste prior to the conching operation and in this alternate process introduces additional steps in reaching that required paste. However, if desired, this alternate process may be practiced.

Also, although not preferred, the series of shearing devices may be constituted by a series of blades and impellers mounted on a single shaft with the discharge of an upper shearing device feeding directly into the intake of the next under shearing device. This will allow one power source to drive the entire mixing apparatus and eliminate the necessity of separately feeding the shearing devices. However, this arrangement restricts the latitude of the operation and is not preferred.

Irrespective of the arrangement of the shearing devices and the operation thereof, within the latitude above-described, the resulting paste must be homogeneous in nature, i.e., a uniform distribution of the ingredients. Otherwise the conching operation may not be uniform, particularly with the fast conching operation of the above-noted patents, the preferred form of the present invention. The paste need not be a permanent slurry or suspension, but the ingredients should be so uniformly dispersed in the paste that the paste may be transferred, conveniently, from the mixing operation to the conching operation without any substantial non-uniform redistribution of the ingredients in the paste. Generally speaking, the paste should be stable for at least 3 or 4 minutes, but more usually, the paste will be stable for several hours or more, i.e., no substantial settling of the solids will take place within the foregoing time periods.

During mixing a temperature rise ensures the required homogeneity of the paste. Further, as explained above, this increase in temperature is mechanically accomplished. In this regard, the term "mechanically" means that the mechanical energy is converted to heat in the mixing by virtue of friction, shear, and the like, generated during the mixing operation. This does not mean, however, that no heat may be added by heat transfer through the shearing apparatus, e.g., a heat jacket and the like, or by heating the ingredients coming into the apparatus. However, since the mechanical generation of heat places the heat directly into the ingredients and does not require a higher temperature heat transfer surface, e.g., a jacket surface, the mechanically generated heat should be the major heat input into the mixing apparatus. This will avoid any localized higher heating which might deteriorate the flavors of the candy.

After mixing, the paste is preferably cooled, again, so that no unnecessary deterioration of the flavors takes place. On the other hand, if the paste is to be feed immediately to the conching operation, no cooling is required. Generally, however, the paste should not be maintained at temperatures in excess of 60° C. for any substantial length of time and more preferably the temperature of the paste should be less than 50° C. during any storage period.

As noted above, the present paste may be used in a conventional conching operation, the details of which are well known to the art, will not be described herein. It is, however, preferred that the conching take place according to the above-noted U.S. patents, the entire disclosures of which are incorporated herein by reference and relied upon for their disclosures. However, very briefly, the blades of the shearing device will be adjusted so that the average shear component is at least 75° in order to ensure that the proper shearing takes place, but preferably the average shear component will be between 85° and 89.9°, and more preferably between 87° and 89.5°. A preferred average shear component is 89° ($\theta = 1°$).

Since the temperature must be raised extremely rapidly in the conching operation, the feed rate or input to the conching device must be adjusted so that with mixing, shearing an extrusion of the conched mixture between the blades, sufficient mechanical energy is generated to raise the conching temperature to preferably between 60° C. and 121° C. in less than 30 seconds, although temperatures up to 160° C. may be used. It is preferred, however, that these temperatures be between 60° C. and 110° C., and optimum temperatures are between 60° C. to 80° C. More preferably, the conching time should be less than 15 seconds, and even more preferably less than 10 seconds.

After conching, the conched mixture should be rapidly cooled to below 60° C. in order to prevent undesired deterioration of the flavor, and more preferably less than 50° C. To avoid any overheating, the cooling should take place in less than 10 minutes and more preferably in less than 5 minutes and, for longer storage time, the conched mixture should be cooled to below 40° C.

During either the conventional conching operation or the fast conching operation, the moisture will be reduced to a lower level. For some candies, this moisture content may be as high as 8% but more preferably the moisture content will be 5% or less, and very often as low as 1% or even lower.

The conching will reduce the average particle size of the ingredients whereby there will be at least one dimension of 40 microns or less and this will ensure that a smooth texture and absence of "gritty" mouth feel will result.

The invention will be illustrated by the following example, although the invention is not limited thereto and is fully applicable to the foregoing disclosure. In the specification, the following example and claims, all percentages and parts are by weight unless otherwise indicated.

EXAMPLE

The following dry ingredients were preblended in a ribbon blender until a homogeneous mechanical mixture was achieved.

Hard butter (36.7°–39° C. melt): 33 parts
Cocoa: 8.19 parts
Sugar: 51 parts
Non-milk solids: 5 parts
Lecithin: 0.4 parts
Flavors (vanilla and salt): 0.14 parts A first shearing device, as shown in FIG. 1 (an Urschel Comitrol #1250) was arranged with 180 blades set at a 2° offset (88° shear component). The average particle size of the ingredients going into the first shear device was 350 microns and the ingredients were preheated with stirring to 58° C. After passing through the first shearing device, the temperature of the ingredients was raised to 70° C. and the average particle size was reduced to 212 microns.

A second shearing device was arranged with 200 blades and a 1° offset (89° shear force). The temperature of the ingredients was raised to 64° C. and passed through that shearing device, during which the temperature was raised to 71° C. and the particle size was reduced to 125 microns.

The resulting paste is acceptable for use in a conching operation described in the aforenoted patents. However, in order to provide an even superior chocolate, a third shearing device was used. In this case, 200 blades were set with no angle ($\theta = 0$) in order to achieve a more uniform dispersion and to raise the temperature of the paste slightly to ensure better homogenization. Thus, the ingredients were heated to 71° C. and passed through the third shearing device, wherein the temperature was raised to 88° C. and the average particle size was reduced to 75 microns.

The resulting paste was passed through a conching shear device, the same nature as used in connection with the mixing operation, except that 212 blades were set at 1° (89° shear component) and the rotation of the impeller was adjusted until the average particle size of solids in the conched mixture was about 25 microns. The conching temperature of the mixture in the shearing device was about 104° C. and the mixture remained in the shearing device for between 4 and 8 seconds. The moisture content of the conched mixture was about 3%.

The resulting candy was smooth in texture, had no "gritty" mouth feel and had a highly developed chocolate flavor. It was considered a superior chocolate candy.

We claim:

1. In a method for producing a conched candy by initially mixing and milling the ingredients of at least sugar and fat on roller mills to form a paste and subsequently conching the paste to a smooth candy with developed flavor, the improvement wherein the mixing and milling of the ingredients is by high speed shearing and mixing wherein the ingredients are subjected to shearing forces having an average shear component of 75° or greater to produce an essentially mechanically generated mixing temperature of about 120° C. or less and to produce a paste mixture having an average particle size of the ingredient therein of less than 120 microns in a mixing time of less than 5 minutes.

2. The method of claim 1 wherein the paste mixture is conched by high speed shearing and mixing, wherein the mixture is subjected to shearing forces having an average shear component of 75° or greater to produce an essentially mechanically generated conching temperature in the mixture of about 60° C. to about 160° C. in a conching time of 30 seconds or less and to reduce the average particle size of the ingredients to 75 microns or less.

3. The process of claim 2 wherein the ingredients include at least one of cocoa powder, chocolate liquor, milk solids, cocoa butter and hard butter.

4. The process of claim 3 wherein the ingredients also include at least one of an emulsifier and flavors.

5. The process of claim 1 wherein the shear component is 87° or greater.

6. The process of claim 5 wherein the mixing is carried out in a plurality of serial steps.

7. The process of claim 6 wherein the shear component degree of the first step is less than the shear component degree of the last step.

8. The process of claim 7 wherein the last shear component is 90°.

9. The process of claim 1 wherein the average particle size of the non-fat ingredients which is passed to the mixing step is less than 900 microns but greater than 100 microns.

10. The process of claim 1 wherein the mixing temperature is 110° C. or less.

11. The process of claim 10 wherein the mixing temperature is 93° C. or less.

12. The process of claim 1 wherein the mixing temperature is at least 50° C.

13. The process of claim 1 wherein the mixing time is 1 minute or less.

14. The process of claim 13 wherein the mixing time is 30 seconds or less.

15. The product produced by the process of claim 1.

* * * * *